United States Patent
Garman

[11] Patent Number: 6,101,760
[45] Date of Patent: Aug. 15, 2000

[54] FISH HOOK ORGANIZER

[76] Inventor: Scott S. Garman, 2840 Alder Ave., Morro Bay, Calif. 93442

[21] Appl. No.: 09/394,484

[22] Filed: Sep. 11, 1999

[51] Int. Cl.$^7$ ................................................ A01K 97/06
[52] U.S. Cl. ............................................................ 43/57.1
[58] Field of Search ..................... 43/54.1, 57.1, 43/57.2; 206/315.11, 365, 380, 382, 383; 211/60.01, 69, 69.8, 126.3

[56] References Cited

U.S. PATENT DOCUMENTS

| | | | |
|---|---|---|---|
| 578,458 | 3/1897 | Knieriemen | 43/57.1 |
| 952,314 | 3/1910 | Ellsworth | 43/57.1 |
| 1,687,137 | 10/1928 | Myers | 211/69.8 |
| 2,659,485 | 11/1953 | Duley et al. | 211/69 |
| 2,724,208 | 11/1955 | Nelson | 43/57.1 |
| 2,749,654 | 6/1956 | Harris | 43/57.2 |
| 2,978,830 | 4/1961 | Killian | 43/57.1 |
| 3,768,635 | 10/1973 | Eggert | 206/380 |
| 4,073,085 | 2/1978 | Stremeckus | 43/54.1 |
| 4,631,856 | 12/1986 | Born | 43/57.1 |
| 5,357,707 | 10/1994 | Lewis | 43/57.2 |
| 5,681,539 | 10/1997 | Riley | 211/69 |
| 5,815,979 | 10/1998 | George | 43/57.2 |
| 5,820,538 | 10/1998 | Watkinson | 211/69 |
| 5,829,185 | 11/1998 | Myers | 43/57.1 |
| 5,848,714 | 12/1998 | Robson et al. | 211/126.3 |
| 5,941,017 | 8/1999 | Junck et al. | 43/57.2 |

*Primary Examiner*—Michael J. Carone
*Assistant Examiner*—Darren W. Ark
*Attorney, Agent, or Firm*—Daniel C. McKown

[57] ABSTRACT

An organizer to which fish hooks of various sizes may be removably attached includes two parallel edges, each having a sequence of notches into which the fish hook is pushed in a forced fit. This results in the hooks being held securely so that they do not accidently come loose. Successive hooks are pushed into successive notches in the series of notches, with the result that the fish hooks are juxtaposed for ease of handling. In one embodiment each organizer is provided with male and female connecting elements, thereby permitting two such organizers to be joined to form a combined organizer of greater capacity. The organizer may be supplied in unassembled form enabling it to be packaged in the same envelopes that are used for packaging the fish hooks for sale. Alternatively, the organizer may be formed as a one-piece article.

2 Claims, 2 Drawing Sheets

FISH HOOK ORGANIZER

BACKGROUND OF THE INVENTION

1. Field of the Invention

The present invention is in the field of fishing, and it specifically relates to an organizer for fish hooks of various sizes.

2. The Prior Art

Sport fishermen usually carry their fishing equipment in a tackle box. Included among the items typically found in such a box are lures, weights, tools, and an assortment of hooks. Although the hooks are usually contained in an envelop or package when purchased, the packaging is typically bulky and hard to store in a tackle box compartments. Fishermen will discard the packaging and will place the hooks in a divided tray section of the tackle box.

Several problems result from this practice. Because the hooks inevitably become intermingled with the other equipment in the tackle box, it is difficult to see how many hooks are in the box and what size they may be. Hooks in general tend to lay flat on the bottom of tackle box compartments where moisture settles. Over a short period of time hooks will rust in storage and be of no use. Because of the sharpness of the points of hooks, it is not uncommon for a fisherman to prick himself on a hook while rummaging in his tackle box for some other piece of gear.

As a result of experiencing these problems, the present inventor recognized the need for a fish hook organizer that could be carried in a variety of tackle boxes.

SUMMARY OF THE INVENTION

The fish hook organizer of the present invention is intended to avoid the aforementioned problems in a simple, economical, and highly effective manner.

In accordance with the present invention, each fish hook is retained on the organizer by removably engaging the curved portion of the hook, referred to herein as the radius of the hook, into a tight-fitting notch in an edge of the organizer. The straight portion, or shank, of the fish hook is also removably inserted into a notch in a different edge portion of the organizer.

In the preferred embodiment, each of the edges is provided with a row of notches. After a first hook has been secured to the organizer, a second hook may be secured by pushing the second hook into notches adjacent those notches used by the first hook. In this manner, a number of hooks may be juxtaposed on the organizer, and because they do not cross over one another, a selected hook may be removed from the organizer without disturbing the other hooks.

In a preferred embodiment, a first row of notches is formed along one edge of a rectangular base. A panel extends perpendicular to the base and has a free edge along which a second row of notches is provided. The second row of notches is parallel to and spaced from the first row of notches. In a variation of the preferred embodiment, the panel is removable from the base, while in another variation, the panel and base are different portions of a one-piece article. In another variation, a second panel parallel to but spaced from the first panel is provided.

In a further variation of the preferred embodiment, each organizer is provided with a male connecting element and a female connecting element, so that the organizers can be joined together in pairs. The resulting combined structure can accommodate twice as many hooks and it can be configured to accommodate hooks of a wider range of sizes.

In the preferred embodiment, the organizer is composed of plastic. In one variation, the organizer is molded as a one-piece three-dimensional article. In a different variation, the panels are separable from the base. This permits the organizer to be shipped in a flat package, and the user must assemble the organizer by inserting the panels into connecting elements on the base.

The organizer of the present invention keeps the hooks separated and easily visible so the user can instantly see how many hooks of each size are available. Because the organizer is larger than any of the hooks, it does not work its way to the bottom of the tackle box, and this is helpful in that the hooks are more readily available and less likely to rust in storage.

The structure of the organizer and its variations will be described more fully below in connection with the accompanying drawings; however, the drawings are for the purpose of describing an exemplary embodiment of the invention and are not intended to limit the scope of the invention.

DETAILED DESCRIPTION OF THE PREFERRED EMBODIMENT

Figure 1:
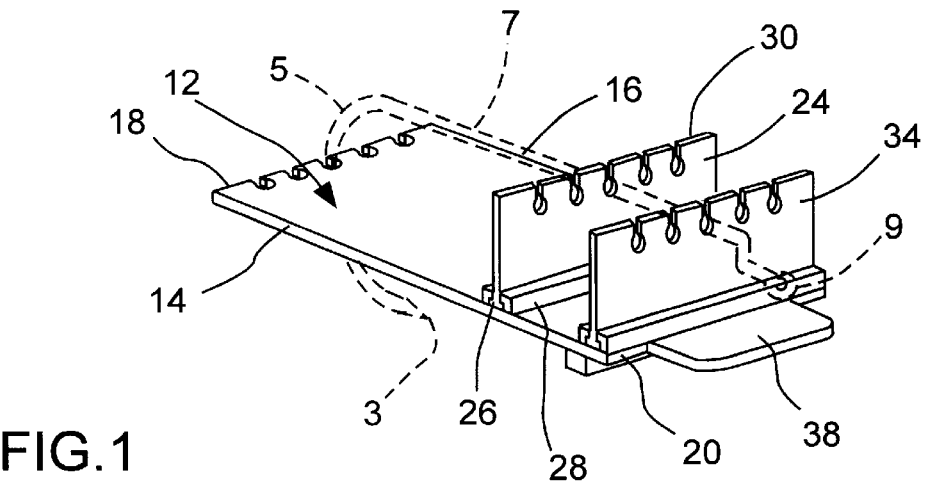
FIG. 1 is a perspective view showing a preferred embodiment of the fish hook organizer of the present invention assembled and in use, and showing a fish hook in phantom lines.

The type of fish hook with which the present invention is used is shown in phantom lines in FIG. 1. The fish hook includes a point 3, a radius portion 5, a shank portion 7 and an eye portion 9. The shank portion 7 is not necessarily straight, and the eye portion 9 can have a wide variety of shapes.

As seen in FIG. 1, the fish hook organizer includes a base 12 in the form of a generally rectangular plate. The base includes a first side edge 14 and a second side edge 16 parallel to the first side edge 14. The base also includes a first end edge 18 and a second end edge 20 which is parallel to the first end edge. Because the first and second end edges are shorter than the first and second side edges, it may be said that the end edges extend laterally across the base.

A sequence 22 of notches extends laterally along the first end edge 18. The width of the notches is equal to the width of the fish hook so that the fish hook must be forced-fitted into the notch. As a result, the fish hook is held tightly within the notch, and a deliberate effort must be made to pull the fish hook from the notch.

A first panel 24 extends laterally across the base and perpendicular to the base. The panel 24 includes a key 26 formed at its edge, and the key 26 is slidably engaged within the keyway 28 which is an integral part of the base 12. The first panel 24 includes a free laterally-extending edge 30 along which a sequence 32 of notches is formed. The sequence 32 is identical in terms of notch widths and spacing to the sequence 22 at the first end edge 18.

In one variation of the preferred embodiment, a second panel 34 including a sequence 36 of notches is included to hold the fish hook more securely.

Figure 2:
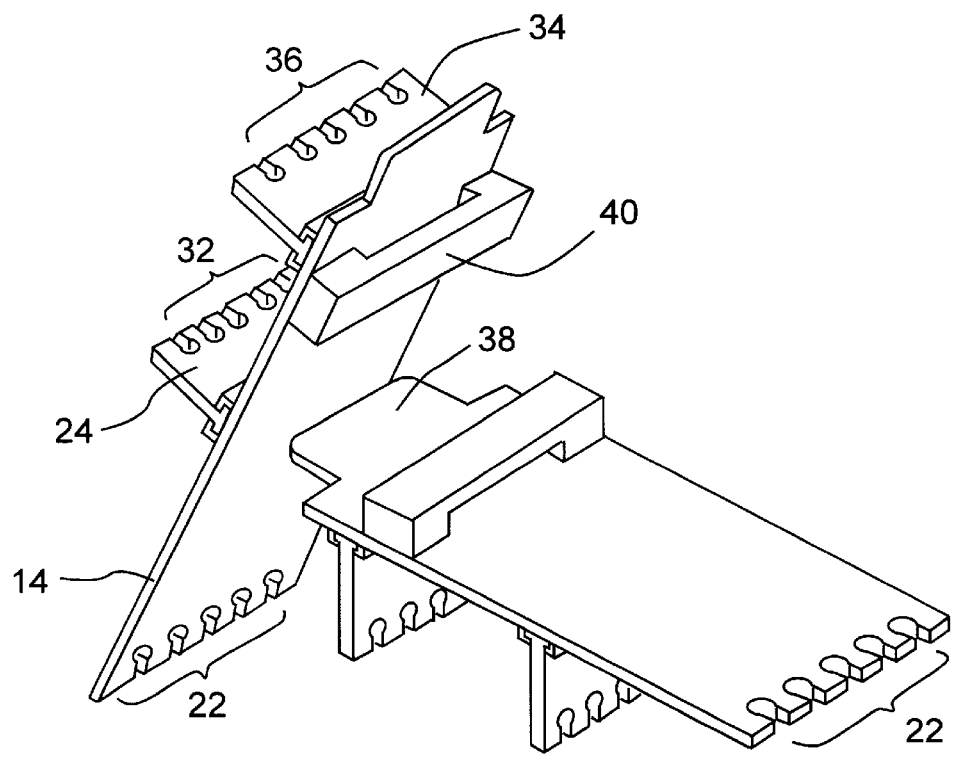
FIG. 2 is a perspective view showing two fish hook organizers of the preferred embodiment prior to their being engaged.

A tongue 38 extends from the second end edge 20 in the preferred embodiment. On the opposite surface of the base from the panels 24 and 34, a strap 40 extends laterally across the base but is spaced from the base. Two organizers, such as those shown in FIG. 2 can be joined by inserting the tongue of each organizer into the space between the strap and the base of the other organizer. The resulting combined structure will hold twice as many fish hooks as the organizer of FIG. 1 in a compact space.

Figure 3:
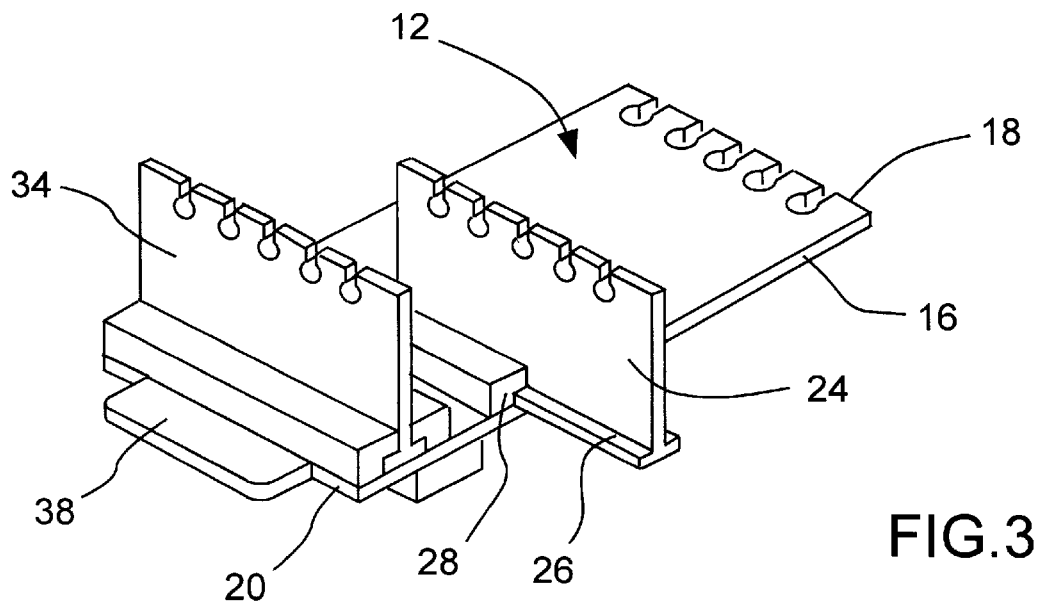
FIG. 3 is an isometric view of the fish hook organizer of FIGS. 1 and 2 after one of the panels has been drawn partly out of the base; and, FIG. 4 is a top plan view of the fish hook organizer of FIG. 1.

FIG. 3 shows the first panel 24 partially drawn out of its keyway 28.

Figure 4:
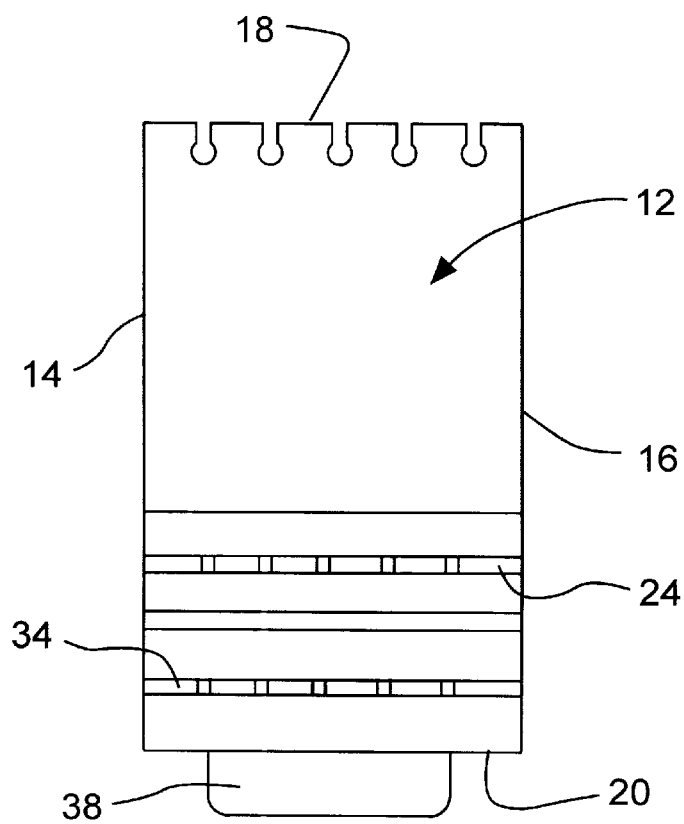

FIG. 4 is a top plan view of the organizer of FIG. 1.

From the foregoing description it should be seen that the organizer of FIG. 1 can be supplied in unassembled form. In that form, the base and the panels are relatively flat. When supplied in this unassembled form, the organizer can be easily fitted into the same envelop that the fish hook is packaged in. If this possibility is of no importance, then the entire organizer may alternatively be molded as a one-piece article.

Thus, there has been described an organizer for fish hooks that securely holds the fish hooks and permits the user to tell at a glance how many hooks of each size are available. The organizer improves safety by reducing the frequency of accidental contact with the points of the fish hooks, and because the organizer is larger than the individual fish hooks, the hooks are prevented from settling to the bottom of the tackle box and from becoming rusty during storage by lying in any water that might be in the bottom of the tackle box. In one variation of the preferred embodiment, the organizer may be made available in disassembled form so that it will fit into the same envelopes that are used for packaging the fish hooks.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A fish hook organizer comprising:

a base in the form of a flat rectangular plate having two parallel side edges and parallel first and second end edges;

a first pattern of notches extending along said first end edge;

a panel attached to said base, extending laterally across said base and perpendicular to said base and having an upper edge and a lower edge;

a second pattern of notches extending along the upper edge of said panel, wherein said second pattern of notches is the same as said first pattern of notches; and, a keyway extending across said base and a key extending along the lower edge of said panel for removably engaging said panel to said base.

2. A fish hook organizer comprising:

a base in the form of a flat rectangular plate having two parallel side edges and parallel first and second end edges;

a first pattern of notches extending along said first end edge;

a panel attached to said base, extending laterally across said base and perpendicular to said base and having an upper edge and a lower edge;

a second pattern of notches extending along the upper edge of said panel, wherein said second pattern of notches is the same as said first pattern of notches; and, wherein said base further includes a tongue extending from said second end edge and a strap located below said base and extending laterally across said base near the second end edge of said base, said strap having end portions attached to said base and extending from said base, and having an intermediate portion connecting said end portions and spaced from said base so that a gap is formed between said strap and said base.

\* \* \* \* \*